Nov. 5, 1968   C. C. AUSTIN   3,408,931
PORTABLE TICKET PRINTER
Filed June 1, 1965   3 Sheets-Sheet 2
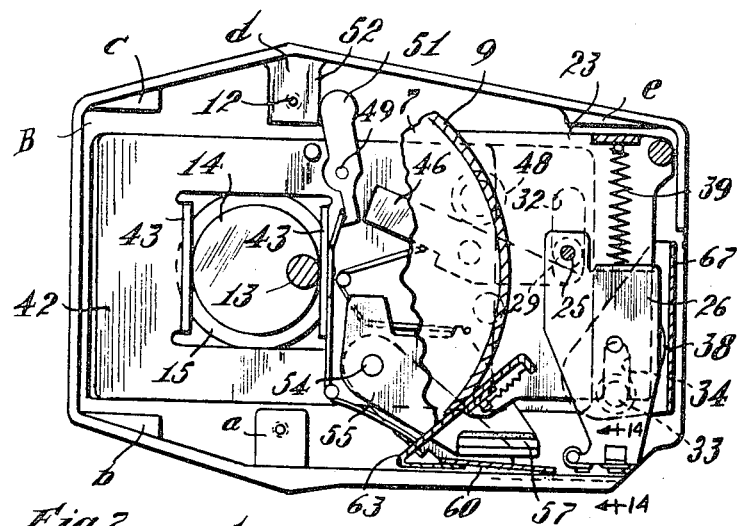
Fig. 7
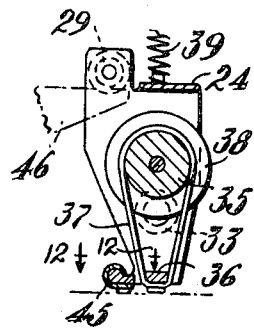
Fig. 10
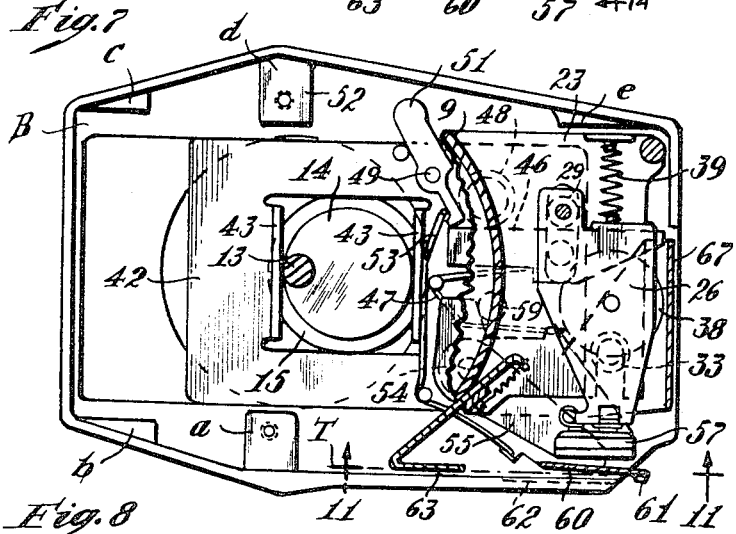
Fig. 8
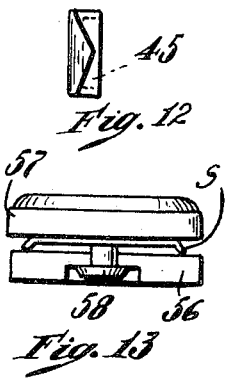
Fig. 12
Fig. 13
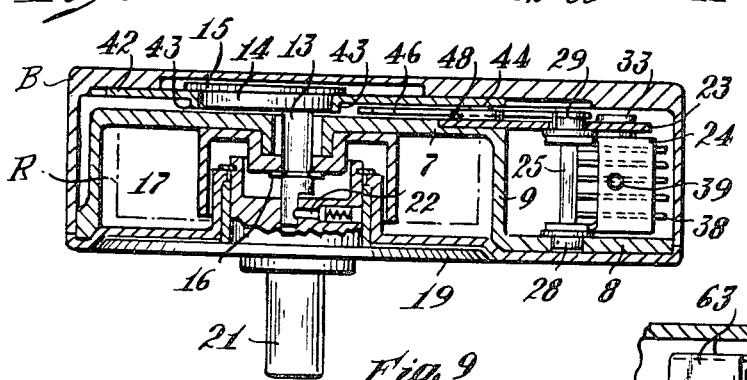
Fig. 9
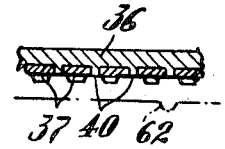
Fig. 14
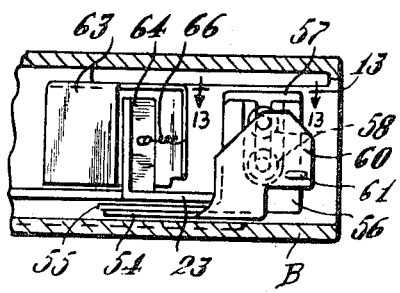
Fig. 11

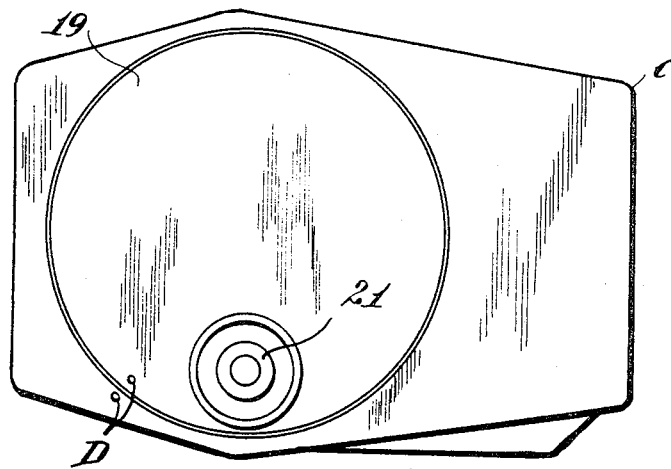
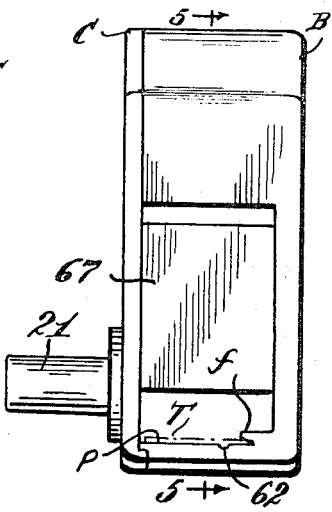
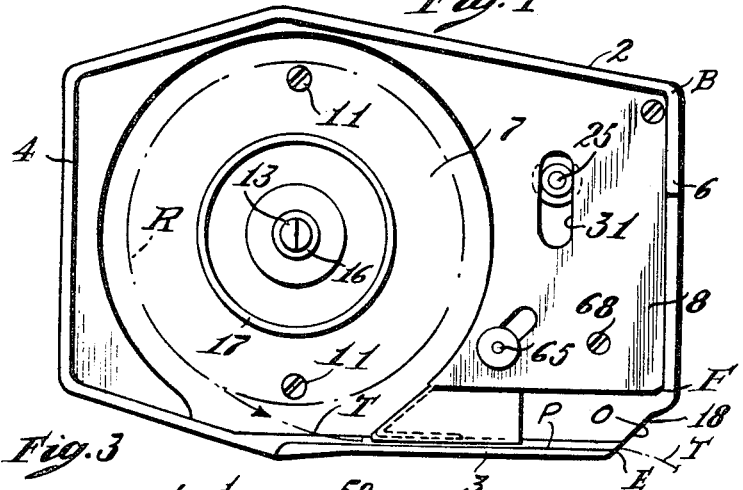
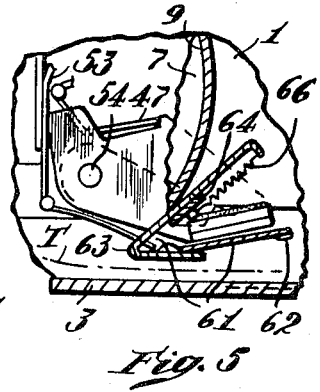
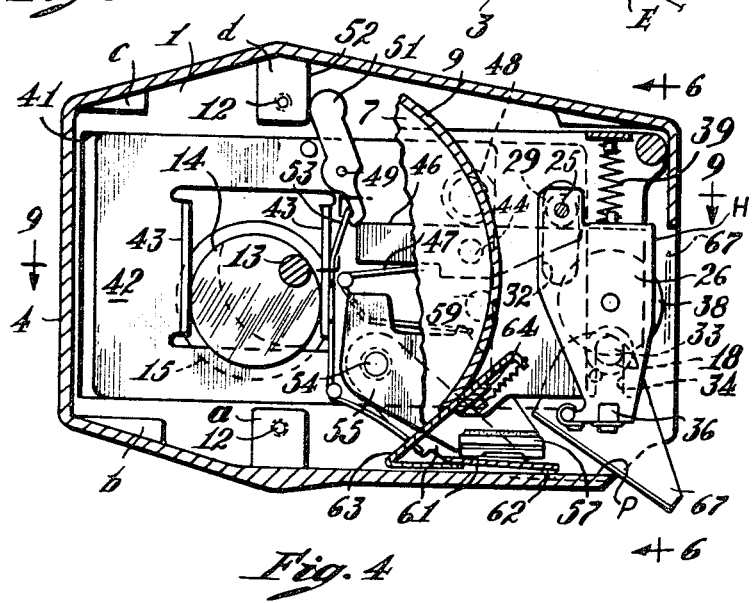
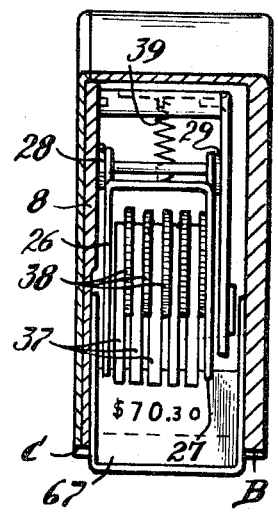

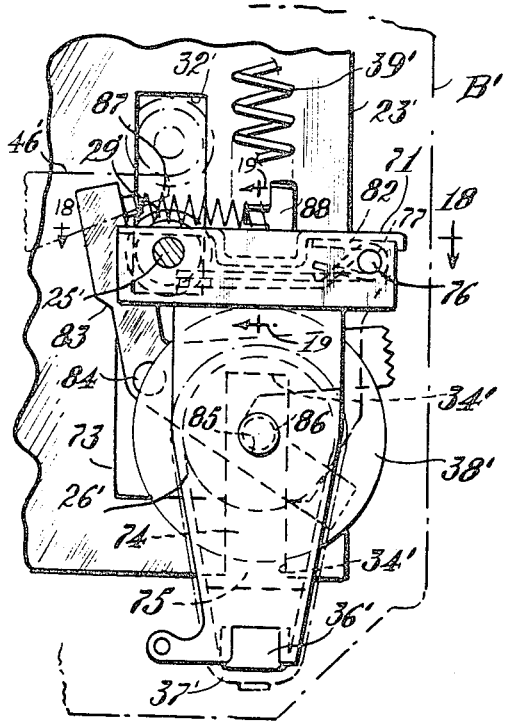
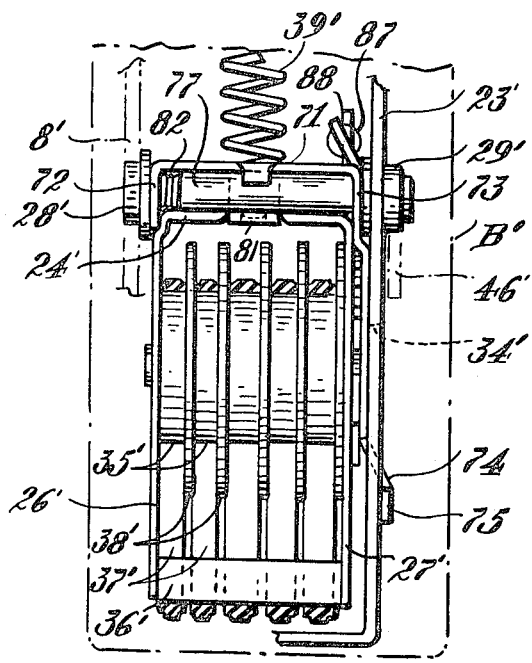
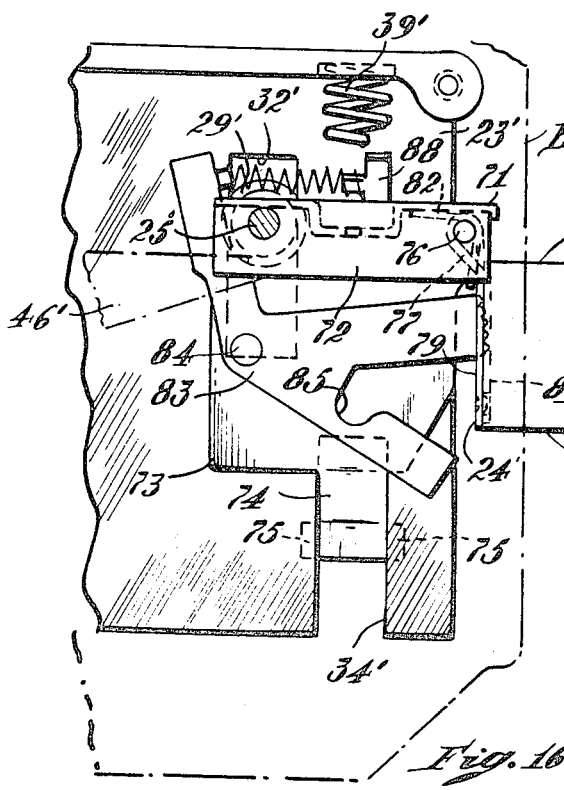
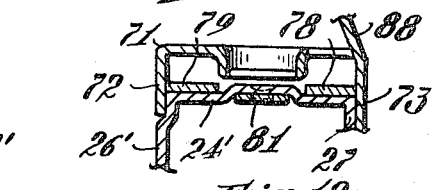
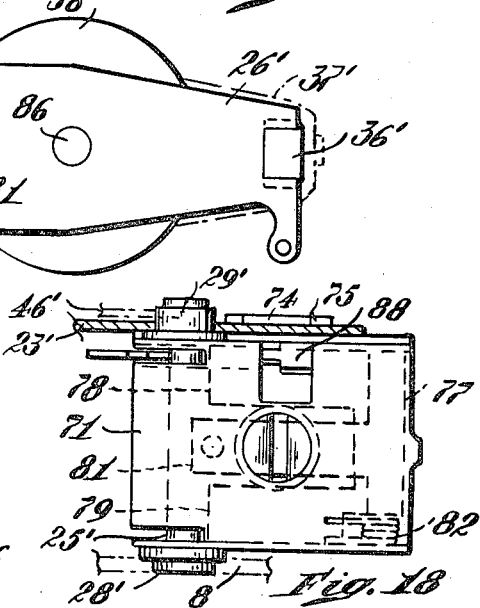

United States Patent Office 3,408,931
Patented Nov. 5, 1968

3,408,931
PORTABLE TICKET PRINTER
Charles C. Austin, Nashua, N.H., assignor to Dennison Manufacturing Company, Framingham, Mass., a corporation of Nevada
Continuation-in-part of application Ser. No. 426,153, Jan. 18, 1965. This application June 1, 1965, Ser. No. 460,342
7 Claims. (Cl. 101—318)

ABSTRACT OF THE DISCLOSURE

For printing labels, tickets, tags, etc. mounted in succession on a tape by means of pressure-sensitive adhesive, a portable device of the dial-set type comprising a reciprocating printing head which snaps from retracted to printing position, a reciprocating carriage for cocking the printing head and feeding the tape and a rotary actuator for reciprocating the carriage when rotated in either direction.

---

This is a continuation-in-part of Ser. No. 426,153, filed Jan. 18, 1965, and now abandoned.

Objects of the invention are to produce a device which is light and compact so that it can be carried in one hand, which is simple and economical to produce, which can be operated by turning a rotor in either direction, which facilitates type setting, which permits quick change of printing heads, which is durable and reliable in use, and in which the tape, printing head and inking pad may each be replaced quickly and easily.

In one aspect the present invention involves a printing device comprising a platen, a printing head movable to and from the platen, a spring yieldably urging the printing head from a retracted position to printing position, an actuator movable through a complete cycle for each printing operation, cocking means responsive to the actuator for moving the printing head from printing to retracted position during a part of each cycle, a detent for holding the printing head in retracted position during a subsequent part of each cycle, and trip means responsive to the actuator at (or near) the end of the cycle to disengage the aforesaid detent, thereby permitting the spring to snap the printing head to printing position. Preferably the aforesaid actuator comprises a reciprocating carriage having a forward and rearward stroke during each cycle, the cocking means retracting the printing head during the forward stroke and the detent holding the printing head during the rearward stroke, the cocking means comprising a lever pivotally mounted on the carriage and engageable with the printing head on one side of its pivot and a detent on the opposite side of its pivot, and means in the path of the lever to swing it into cocking position during the aforesaid forward stroke, the actuator comprising a rotor and means to move the carriage back and forth through the aforesaid cycle when the rotor is turned one revolution in either direction.

In another aspect the device has a lever mounted on a pivot on the aforesaid carriage intermediate its ends, an inking pad on the forward end of the lever and means in the path of the rearward end of the lever to swing the pad against the type on the printing head at the end of the aforesaid forward stroke. The device also has a reel for tape, a feed pawl on the carriage for advancing the tape one step during each of the aforesaid steps, a casing, and means for lifting the pawl out of feeding position, this last means including a handle extending outside the casing.

In still another aspect the device comprises a platen, a carriage movable toward and from the platen along a predetermined path, means for guiding the carriage along said path, a printing head carrying type in opposition to the platen, and means movably supporting the head on the carriage so that the type may be moved out of opposition to the platen without detaching the head from the carriage. Preferably the head is pivotally mounted on the carriage to swing out from operative position to a setting position at one side of the device with a detent for holding the head in operative position and a spring for pressing the detent into holding position. In the preferred embodiment the device comprises a spring for snapping the head from operative position to setting position when said detent is released, and the means for supporting the head on the carriage comprises a pivot pin on the carriage and a friction hinge on the pin holding the head detachably.

In the preferred embodiment the device comprises a back and a front, the aforesaid platen and trip means being disposed on the back, the actuator and detent being movably mounted on the back, and the printing head being detachably mounted on the front so that it may be removed readily when the front is separated from the back. The inking pad is detachably mounted on said lever so that it may be removed without separating the front and back. A cover is detachably mounted over said front and the front has a well for a tape reel which is accessible when the cover is removed.

For the purpose of illustration typical embodiments of the invention are shown in the accompanying drawings in which FIG. 1 is a side view;
FIG. 2 is a front view;
FIG. 3 is a side view with the cover removed;
FIG. 4 is a side view with a part of the aforesaid front broken away, showing the parts in the position they occupy near the end of a cycle just before the printing head snaps down;
FIG. 5 is a similar view showing the feed pawl lifted to facilitate threading the tape;
FIG. 6 is a vertical section on line 6—6 of FIG. 4;
FIG. 7 is a view like FIG. 4 showing the parts in printing position at the end of a cycle;
FIG. 8 is a similar view showing the parts in inking position;
FIG. 9 is a section on line 9—9 of FIG. 4;
FIG. 10 is a vertical section of the printing head;
FIG. 11 is a section on line 11—11 of FIG. 8;
FIG. 12 is a plan view from line 12—12 of FIG. 10;
FIG. 13 is a side view of the ink pad and support viewed from the line 13—13 of FIG. 11;
FIG. 14 is a section on line 14—14 of FIG. 7;
FIG. 15 is an enlarged side view of the assembled printing head showing a modification;
FIG. 16 is a view like FIG. 15 showing the printing head swung from operative position to setting position;
FIG. 17 is a front view of the printing head of FIG. 15;
FIG. 18 is a section on line 18—18 of FIG. 15; and
FIG. 19 is a section on line 19—19 of FIG. 15.

The particular embodiment shown in FIGS. 1 to 14 comprises a back B, a front F and a cover C. The back constitutes a casing having a rear wall 1, a top 2, a bottom 3 and end walls 4 and 6. The front has a back wall 7 and a front wall 8 integrally connected by a cylindrical wall 9. The rear wall of the front F seats on the raised surfaces *a*, *b*, *c*, *d* and *e* (FIG. 4) of the back wall 1 and is secured by screws 11 extending through the front and threading into openings 12 in the back (FIGS. 3 and 4). Extending through the back wall 7 of the front F coaxially with the cylindrical wall 9 is a short shaft 13 carrying an eccentric disk 14 and held in place by a pin 16 (FIG. 9). Between wall 7 and pin 16 a collar 17 is freely rotatable on the shaft 13. As shown in FIG. 3 a roll R of label-carrying tape T is telescoped over the collar with the tape extending out through the opening 18 in the righthand end of the front F. The shaft 13 is rotated by a rotor 19 journaled in the cover C, the outer end of the rotor having an off-center handle 21 constituting an actuator and the inner end having a semicylindrical recess to receive the semicylindrical forward end of the shaft 13. A spring-pressed detent 22 serves to hold the cover C in place (FIG. 9).

Fast to the back of the back wall 7 of the front F is a plate 23 opposite to the front wall 8 (FIG. 9). Vertically reciprocating between 8 and 23 is a printing head H comprising a V-shaped support having a cross-bar 24 and depending legs 26 and 27. Journaled in the legs is a shaft 25 carrying at its opposite ends rollers 28 and 29 disposed in slots 31 and 32 in front wall 8 and plate 23. The rear leg 27 carries another roller 33 sliding in a slot 34 in plate 23. The legs 26 and 27 support a shaft carrying pulleys 35 and a cross-bar 36. Trained around the pulleys and cross-bar are type-carrying belts 37 (FIG. 10). Fast to each pulley is a knurled wheel 38 for setting the type belts to print the desired indicia. A spring 39 urges the printing head downwardly from the retracted position shown in FIG. 4 to the printing position shown in FIG. 7. Projecting downwardly from the cross-bar 36 between the belts 37 are lugs 40 (FIG. 14) which serve as guides for the belts. By giving these lugs a color contrasting with that of the belts the lugs also help to indicate when the printing type are aligned in proper printing position.

A printing chase 45 carrying additional printing characters may be mounted on the head. As shown in FIGS. 10 and 12 the chase comprises a spring tongue which slips endwise over the cross-bar 36 of the printing head with only the tip of the tongue seating on the upper side of the cross-bar 36 so that the chase is self-leveling.

The printing head may be removed readily for repair or replacement by snapping off the cover C, separating the front F from the back B by removing screws 11 and 12, pushing out the shaft 25 endwise, and then pulling the printing head down from between the front walls 8 and back plate 23.

Sliding in a groove 41 in the rear wall 1 of the back B is a carriage 42 having forwardly projecting flanges 43 straddling the eccentric disk 14 so that when the rotor 19 is turned either clockwise or counterclockwise, the carriage is reciprocated back and forth from the retracted inking position shown in FIG. 8 to the advanced printing position shown in FIG. 7. Thus the device is convenient to use by either a left-handed or right-handed operator. The disk 14 has a flange 15 overlapping the back of the carriage to hold the carriage on the back of front F.

Pivotally mounted on the front of the carriage at 44 is a lever 46 which is urged clockwise by a spring 47. Journaled on the back of the plate 23 is a roller 48 which bears on the upper edge of the lever 46. Journaled on the front of carriage 42 at 49 is a detent 51 having its lower end adapted to bear on the rear end of lever 46 to counteract the spring 47 (FIGS. 4 and 8) and having its upper end engageable with a shoulder 52 on the back B to disengage the detent from the lever and thus permit the printing head to snap to printing position at the end of each cycle (FIG. 7). A spring 53 urges the detent counterclockwise into the operative position shown in FIG. 8. Thus the lever 46 and roller 48 serve as cocking means for moving the printing head from printing position to retracted position, and shoulder 52 serves as trip means for disengaging the detent 51 at the end of a cycle.

Pivotally mounted on the carriage 42 at 54 is a lever 55 which has a bifurcated foot 56 extending forwardly from the lower end. An ink pad 57 is mounted on the foot by means for headed pins 58 frictionally held in the bifurcation in the foot (FIG. 11). The lower end of spring 47 swings the lever 55 clockwise into the retracted position shown in FIGS. 4 and 7. Mounted on the rear of plate 23 in the path of the upper end of lever 55 is a pin 59 which swings the ink pad counterclockwise from the retracted position shown in FIG. 7 to the inking position shown in FIG. 8. The front F has an opening O (FIG. 3) through which the inking pad may be replaced without separating the front and back. As shown in FIG. 13 a spring S is interposed between the foot 56 and the pad 57 so that the pad is self aligning and pressed yieldingly against the type.

Pivoted on the same pin 54 between carriage 42 and lever 55 is a feed pawl 60 having a nose 61 for engagement in feed openings in the label-carrying tape T (FIGS. 9 and 11), the nose sliding in a groove 62 in the platen. The lower end of spring 53 urges the feed pawl clockwise into feeding position. The nose 61 is sloping on the rear end so that it rides out of the perforations on the back stroke of the feed pawl. The groove 62 should be located between printing characters as shown in FIG. 14.

Bearing on the tape T is a friction shoe 63 to prevent retrograde movement of the tape as the feed pawl drags back over the tape. The shoe slides between the cylindrical wall 9 and a guide 64 extending forwardly from plate 23 (FIG. 5). A spring 66 yieldingly presses the shoe down against the tape T (FIG. 11). To thread tape into the device the shoe 63 is lifted to the position shown in FIG. 5 by a knob 65 extending forwardly through a slot in the front wall 8 (FIG. 3). By making the knob 65 thin, only slight clearance is required between the front wall 8 and cover C. As shown in FIGS. 4, 5 and 7 the shoe 63 extends under the feed pawl when the pawl is in retracted position so that the pawl is also lifted when the shoe is raised (FIG. 5). Thus a new roll of tape may be installed merely by snapping off the cover C and lifting the friction shoe 63 with the knob 65 to the position shown in FIG. 5. To indicate when the parts are in position for threading and type setting, dots D are provided on the front and rotor (FIG. 1). In this position of the parts the last printed label may be torn off over the edge E (FIG. 3), leaving no printed label in the machine when the printer has been reset.

To view the type at the printing position a mirror 67 is pivotally mounted at 68 to swing from the inoperative position shown in FIGS. 2, 7 and 8 to the operative position shown in FIGS. 4 and 6 where the set type are visible as in FIG. 6.

To assemble the parts the printing head H is mounted on the front F, and the lever 46, detent 51, lever 55 and nose 61 are mounted on the front of the carriage 42. Then the front is placed over the carriage, the shaft 13 is inserted and locked with pin 16 (FIG. 9). Inasmuch as flange 15 on eccentric disk 14 overlaps the back of the carriage the parts are held together. These parts are then inserted as a unit into the back B and secured with screws 11. The cover C is then snapped on.

At the end of a cycle of operations the parts are in the position shown in FIG. 4 where the printing head is held by detent 51 in the upper retracted position. In this position the mirror 67 may be swung into the operative position shown in FIGS. 4 and 6 and the type belts 37 may be reset by wheels 38. After the type has been set the mirror is swung up into inoperative position and the handle 21 is turned to move the carriage to the left from the position shown in FIG. 4 to the position shown in FIG. 7, thereby to disengage the detent 51 from the lever 46, permitting the spring 39 to snap the printing head down to the printing position shown in FIG. 7. Continued movement of rotor 19 shifts the carriage to the position shown in FIG. 8. During this movement the nose of the lever 46 passes under the cross-bar 24 of the printing head and in passing under the roller 48 the lever is swung counterclockwise to the position shown in FIG. 8, thereby lifting the printing head H to retracted position and latching it in that position with detent 51. During this movement the inking pad is also swung into inking position and the feed pawl advances the tape T one step, bringing another label under the printing head to be printed at the beginning of the next cycle. Continued movement of the rotor brings the parts back to the position shown in FIG. 4 where the type may be reset for a new cycle or the movement may be continued to print additional tags before resetting.

The modification shown in FIGS. 15 to 19 differs from the embodiment shown in FIGS. 1 to 14 in the construction of the printing head, parts B', 8', 23', 24', 25', 26', 27', 28', 29', 31', 32', 34', 35', 36', 37', 38', 39' and 46' corresponding to the parts correspondingly designated in FIGS. 1 to 14. Whereas the printing head 24–26–27 of the first embodiment has only up-and-down movement, the printing head 24'–26'–27' of the modification also has pivotal movement through 90' from the operative position shown in FIG. 15 to the setting position shown in FIG. 16 where the type belts 37' may be reset conveniently by means of the setting wheels 38'. The printing head 24'–26'–27' is pivotally mounted on a carriage 71 having depending front and rear legs 72 and 73. The rear leg has a narrow extension 74 fitting in slot 34'. The lower end of the extension has ears 75 overlapping the rear side of the plate 23' to retain the leg in the slot. Journaled in the two legs of the carriage is a shaft 25' which carries on its front end a roller 28' fitting in a slot 32' in the front wall 8' and on its rear end a roller 29' fitting in slot 32' in the rear plate 23'. Thus the carriage 71 slides up and down in the slots 32' and 34' in the same way as the head 24 slides in slots 32 and 34 of the first embodiment. A spring 39' yieldingly urges the carriage downwardly to printing position and a lever 46' operating on roller 29' lifts the carriage to retracted position in the same way that the lever 46 lifts the printing head H in the first embodiment (FIGS. 7, 8 and 9).

The printing head H' is pivotally mounted on a pin 76 bridging the space between the legs 72 and 73 of the carriage 71 by means of a hinge 77 surrounding the pin 76 with legs 78 and 79 extending over the head 24' and a leg 81 extending under the head, the legs being resilient so as to pinch the head 24' therebetween. A coil spring 82 surrounds one end of the pin 76 yieldingly to urge the hinge 77 from the operative position shown in FIG. 15 to the setting position shown in FIG. 16.

To retain the printing head in operative position against the action of the spring 82 a detent 83 is mounted on a pivot pin 84, the detent having a recess 85 to receive a stud 86 on the side of the printing head. The detent is urged toward holding position by means of a spring 87 extending between the upper end of the detent and an ear 88 on the carriage 71. When the head is swung from setting position to operative position the stud 86 snaps into the recess 85. To permit the spring 82 to snap the head from operative position to setting position, the detent is given a slight clockwise movement to permit the stud 86 to move out of the recess 85.

In the modification of FIGS. 15 to 19 the printing head may be snapped out to setting position merely by tripping the detent. Moreover the printing head may be removed for repair or replacement merely by slipping it off the spring fingers of the hinge.

It should be understood that the present disclosure is for the purpose of illustration only and that this invention includes all modifications and equivalents which fall without the scope of the appended claims.

I claim:

1. A printing device comprising a platen, a printing head movable to and from the platen, a spring yieldingly urging the printing head from a retracted position to printing position, an actuator movable through a complete cycle for each printing operation, cocking means responsive to said actuator for moving the printing head from printing to retracted position during a part of said cycle, a detent for holding the printing head in retracted position during a subsequent part of said cycle, and trip means responsive to said actuator at the end of the cycle to disengage said detent, thereby permitting said spring to snap the printing head to printing position, said actuator comprising a reciprocating carriage having a forward and rearward stroke during each cycle, said cocking means retracting the printing head during the forward stroke and said detent holding the printing head during the rearward stroke, and said cocking means comprising a lever pivotally mounted on said carriage and engageable with said detent on the side of its pivot opposite the head, and means in the path of the lever to swing it into cocking position during said forward stroke.

2. A printing device according to claim 1 further characterized by a lever mounted on a pivot on said carriage intermediate its ends, an inking pad on the forward end of the lever and means in the path of the rearward end of the lever to swing the pad against the type on the printing head at the end of said forward stroke.

3. A printing device according to claim 2 further characterized by a reel for tape and a feed pawl for advancing the tape one step during each of said forward steps, the feed pawl being mounted on said pivot.

4. A printing device according to claim 1 further characterized by a back and a front, said platen and trip means being disposed on the back, said actuator and detent being movably mounted on the back, and said printing head being mounted on said front.

5. A printing device according to claim 4 further characterized by means for detachably mounting the printing head on said front so that it may be removed readily when the front is separated from the back.

6. A printing device according to claim 2 further characterized by means for detachably mounting the inking pad on said lever so that it may be removed without separating the front and back.

7. A printing device according to claim 4 further characterized by a cover detachably mounted over said front and the front has a well for a tape reel which is accessible when the cover is removed.

References Cited

UNITED STATES PATENTS

| | | | |
|---|---|---|---|
| 2,632,385 | 3/1953 | Degen | 101—291 |
| 3,244,097 | 4/1966 | McRae et al. | 101—334 |
| 3,101,049 | 8/1963 | Huppert | 101—318 |
| 2,541,684 | 2/1951 | Barger | 101—26 |
| 2,495,389 | 1/1950 | Sammann | 101—288 |
| 1,665,467 | 4/1928 | Miller | 101—19 |
| 1,340,380 | 5/1920 | Davis | 101—288 |

ROBERT E. PULFREY, *Primary Examiner.*

EUGENE R. CAPOZIO, *Examiner.*

F. A. WINANS, *Assistant Examiner.*